Dec. 1, 1959  T. T. GRAHAM  2,915,152
LEAK-PROOF BOLT
Filed March 12, 1957

Thomas T. Graham
INVENTOR.

BY J. Vincent Martin
Jod E. Edwards
ATTORNEYS

United States Patent Office 2,915,152
Patented Dec. 1, 1959

2,915,152

LEAK-PROOF BOLT

Thomas T. Graham, Houston, Tex.

Application March 12, 1957, Serial No. 645,596

10 Claims. (Cl. 189—36)

This invention relates to new and useful improvements in leak-proof bolt assemblies.

In the construction of structures, such as liquid storage vessels or tanks, it has been the general practice to form the structure of plates or sections which are bolted together to form the complete unit. Where the structure is to contain a liquid, it is evident that leakage at the joint between sections and leakage past the bolts making the connection must be prevented to accomplish the intended purpose, and although the problem of eliminating leakage at the joint is relatively simple, the elimination of leakage around the connecting bolts has been difficult, particularly where any appreciable pressure is present within the interior of the structure.

It is, therefore, one object of this invention to provide an improved bolt assembly for connecting the sections or plates of structures, which assembly is constructed so that a leakage of fluid past the connecting bolt of the assembly is effectively prevented.

An important object of the invention is to provide a leak-proof bolt assembly wherein a cylindrical sleeve element is combined with the connecting bolt in such a manner that an efficient seal around the bolt and also an effective seal between the sleeve element and the connected sections may be effected.

A further object is to provide a bolt assembly including a sleeve element which is adapted to encircle the major portion of the connecting bolt, whereby an O-ring type of sealing means may be employed to seal the space between the exterior surface of the bolt and the bore of the sleeve to positively prevent any leakage past the bolt; the arrangement permitting the bolt to be threaded at its outer end in the usual manner so that no variation in the standard type of bolt is required.

Another object is to provide a bolt assembly, of the character described, wherein the packing elements which effect a seal between the connected sections also function to seal off between the sections and the bolt assembly to make the complete connection leak-proof.

The construction designed to carry out the invention will be hereinafter described, together with other features thereof.

The invention will be more readily understood from a reading of the following specification and by reference to the accompanying drawings forming a part thereof, wherein an example of the invention is shown, and wherein.

Figure 1:
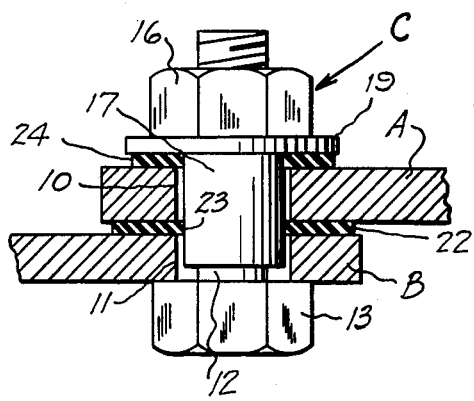
Figure 1 is a transverse, sectional view of a bolt assembly, constructed in accordance with the invention, and illustrating the same connecting two plates or sections of a structure together.

In the drawings, the letter A designates the end portion of a section or plate member while the letter B designates the end portion of a similar section or plate member. The members A and B may be the plate sections of a bolted tank, vessel or other structure which is constructed of a plurality of sections, and said members are to be connected or bolted together. The section of plate A has an opening 10 therein through which a connecting bolt will extend, while the plate B has a similar opening 11 therethrough, said openings being aligned when the sections are placed adjacent to each other. The improved bolt assembly, generally indicated by C, is arranged to connect the plate members or sections A and B together.

Figure 2:
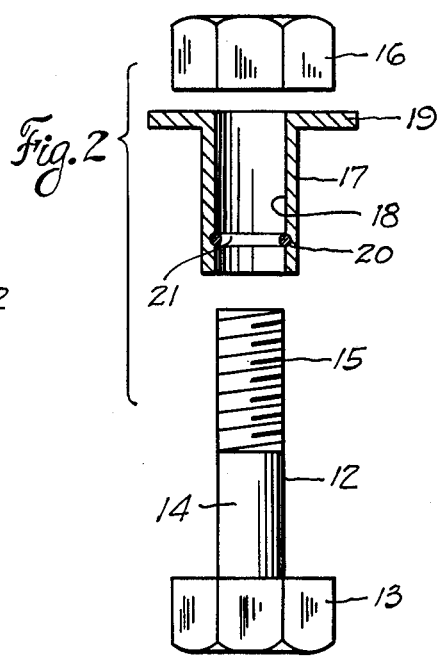
Figure 2 is an exploded view of the parts of the bolt assembly.

The bolt assembly C is clearly illustrated in Figure 2 and includes a bolt 12 having an enlarged head 13 at one end thereof; the bolt shank is preferably smooth for a predetermined distance as indicated at 14, and that end of the bolt opposite the head 13 is formed with the usual external threads 15. These threads are adapted to receive a fastening nut 16.

A cylindrical sleeve 17 is formed with an axial bore 18 extending entirely therethrough, and the bolt 12 is adapted to extend through the sleeve. The sleeve 17 is formed with an external annular flange 19 at one end thereof and within its bore 18 a groove 20 is provided for the reception of a sealing ring 21. It is preferable that the sealing ring be the usual O-ring type of seal. The position of the sealing ring 21 is such that when the parts are in assembled position, as will be explained, the sealing ring 21 is in engagement with the smooth portion 14 of the shank of the bolt 12, and said sealing ring functions to effectively seal the space between the exterior of the bolt 12 and the wall of the bore 18 of the sleeve when the bolt is extending therethrough.

In using the improved bolt assembly, the bolt 12 is passed through the aligned openings 10 and 11 of the plate members or sections A and B until the head 13 of said bolt engages the surface of the adjacent section; as shown in Figure 1, the bolt head 13 abuts the surface of the plate section B, which will be assumed to be on the internal side of the structure. It is pointed out that the bolt head 13 may be either on the interior or exterior of the particular structure.

The sleeve 17 is then passed over the end of the bolt 15 and has its main portion extending downwardly through the opening 10 in the plate member or section A and partially into the opening 11 of section B. A packing strip 22, which may be of any suitable packing material, is placed between the adjacent faces of sections A and B, and is formed with an opening 23 through which the sleeve 17 extends. A suitable packing means in the form of a washer 24 is disposed between the inner surface of the annular flange 19 and the surface of the section A (Figure 1), and is adapted to seal between the flange and the section.

After the bolt 12 and sleeve 17, as well as the packing means 22 and 24 are in position, the fastening nut 16 is threaded onto the projecting threaded end 15 of the bolt and upon being tightened, functions to bring the two sections or plate members A and B together. It will be evident that as the nut 16 is tightened on the bolt, the sections are brought together and a force is applied to the packing means 22 and 24 whereby said packing means is deformed into close sealing engagement with the external surface of the sleeve 17. The packing means 22 seals between the sections A and B and, in addition, would prevent the passage of any fluids or pressure from the area in which the bolt head 13 is located, such pressure passing into the opening 11 and then being stopped by the packing 22. The washer or packing means 24, of course, seals around the sleeve 17 immediately adjacent the flange 19, and would prevent any leakage between the flange, sleeve and section A. Any leakage upwardly through the bore of the sleeve 18 is prevented by the seal ring 21, which, has been noted, is preferably an O-ring type of seal, which will efficiently seal even relatively high pressures.

Figure 3:
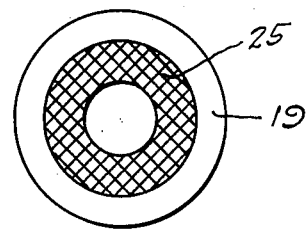
Figure 3 is an end view of the sleeve element illustrating the serrations which may be placed thereon.

It may be desirable to place a lock washer between the flange 19 and the fastening bolt 16, but it has been found that such lock washer may be eliminated by providing a series of annular serrations 25 on the outer surface of the flange 19, as shown in Figure 3. These serrations would be engaged by the inner side of the fastening nut 16, and would function to frictionally prevent a loosening of said fastening nut. Of course, it is evident that the invention is not to be restricted to the use of the serrations although such have been found to be of advantage in eliminating a separate lock washer.

From the foregoing it will be seen that a very effective seal around the fastening bolt is provided. The seal ring 21 within the sleeve 17 prevents any passage of pressure or fluid around the exterior of the bolt. The tightening of the nut applies sufficient pressure to the packing means 22 and 24 to deform the same into tight sealing position with the exterior of the sleeve 17. Any leakage past the exterior of the sleeve 17 is effectively prevented by this tight engagement of the packing means 22 and 24 with said sleeve. It might be noted that the length of the sleeve 17 is such that the fastening nut 16 may be tightened down sufficiently to apply the necessary pressure to the packing means 22 and 24, and, as illustrated in Figure 1, which is intended to show the tightened position of nut 16, there is still a space between the end of the sleeve 17 and the head 13 of the bolt.

Figure 4:
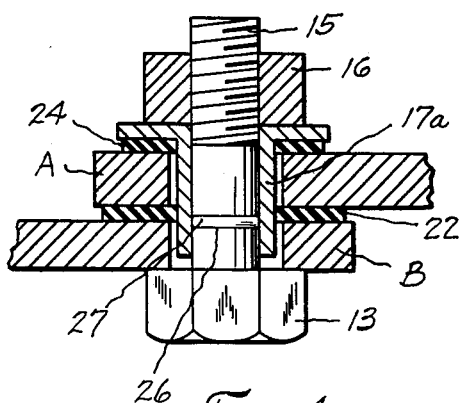
Figure 4 is a view, similar to Figure 1 of a slightly modified form of the invention.

Although it has been found that the provision of the groove 20 within the bore of the sleeve 17 is a satisfactory way of mounting the sealing ring 21, it is not essential that the ring be mounted in this manner. In Figure 4 a modified form of sleeve 17–a has an entirely smooth bore. The shank 14 of the bolt 12 is formed with an annular groove 26, which receives a sealing ring 27. This ring is also of the O-ring type and, obviously when the bolt shank is extended through the sleeve 17–a, the seal ring will seal between the bolt and the bore of the sleeve. In connection with Figure 4, the other parts, as heretofore described, remain the same.

Although only a single seal ring 21 has been illustrated in the form of the invention shown in Figure 2, and a single sealing ring 27 has been shown in the form of Figure 4, it is evident that more than one sealing ring could be provided. As a matter of fact, where more than two plate sections or plate sections of extreme thickness are being connected together, which would require a relatively long bolt and a long sleeve section, it would probably be more advantageous to provide more than one sealing ring between the bore of the sleeve and the exterior of the assembly. The unit is relatively simple in construction and is actually an ordinary bolt and fastening nut in combination with the sleeve member which surrounds a portion of the bolt. Although the flange 19 has been found desirable, it is, of course, evident that this flange could be eliminated and, in place thereof, an annular washer could be used to bear against the packing material 24. The device requires no special tools and may be connected in the usual manner of any standard type bolt.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. A bolt assembly connecting adjacent sections having aligned openings including, a sleeve element extending through the opening of one of the sections and at least partially through the aligned opening of the other section, a bolt extending through the bore of the sleeve having an enlargement on one end engaged with one section, the opposite end of the bolt being threaded and projecting beyond the end of the sleeve, a fastening nut threaded upon the end of the bolt, and sealing means sealing the space between the exterior of the bolt and the bore of the sleeve.

2. A bolt assembly connecting adjacent sections having aligned openings including, a sleeve element extending through the opening of one of the sections and at least partially through the aligned opening of the other section, a bolt extending through the bore of the sleeve having an enlargement on one end engaged with one section, the opposite end of the bolt being threaded and projecting beyond the end of the sleeve, a fastening nut threaded upon the end of the bolt, and an O-ring type seal sealing between the exterior of the bolt and the bore of the sleeve.

3. A bolt assembly as set forth in claim 2, wherein the O-ring type seal is mounted within an annular groove formed in the bore of the sleeve.

4. A bolt assembly as set forth in claim 2, wherein the O-ring type seal is mounted within an annular groove formed in the external surface of the bolt inwardly of the threads on said bolt.

5. A bolt assembly connecting adjacent sections having aligned openings including, a sleeve element extending through the opening of one of the sections and at least partially through the aligned opening of the other section, a bolt extending through the bore of the sleeve having an enlargement on one end engaged with one section, the opposite end of the bolt being threaded and projecting beyond the end of the sleeve, a fastening nut threaded upon the end of the bolt, sealing means sealing the space between the exterior of the bolt and the bore of the sleeve, and packing means between the adjacent surfaces of the abutting sections and disposed in surrounding relationship to the sleeve element, whereby tightening of the nut on the bolt to connect the sections imposes a force upon the packing means to distort the same into sealing engagement with the exterior of said sleeve element.

6. A bolt assembly connecting two plate sections having aligned openings therein, said assembly including a cylindrical sleeve having an enlarged annular flange at one end thereof, the sleeve extending through the opening of one of the sections with its flange engaging the surface of said section and the length of the sleeve being such that its other end extends partially through the opening of the other section, a bolt extending through the sleeve and having a bolt head at one end engaged with the last-named section, the other end of the bolt being threaded and projecting beyond the flanged end of the sleeve, a fastening nut on the threaded end of the bolt, and sealing means between the exterior of the bolt and the bore of the sleeve.

7. A bolt assembly as set forth in claim 6, together with packing means between adjacent surfaces of the sections and disposed in surrounding relationship to the sleeve, whereby tightening of the nut on the bolt to connect the sections deforms the packing means into sealing engagement with the exterior of said sleeve.

8. A bolt assembly as set forth in claim 6, together with packing means between adjacent surfaces of the sections and disposed in surrounding relationship to the sleeve, and an additional packing means between the annular flange of said sleeve and the adjacent section, tightening of the nut on the bolt to connect the sections together, applying a force to both packing means to deform the same into sealing position.

9. A bolt assembly as set forth in claim 6, wherein the sealing means between the exterior of the bolt and the bore of the sleeve is an annular ring which is mounted within an annular groove formed within the sleeve.

10. A bolt assembly as set forth in claim 6, wherein the sealing means between the exterior of the bolt and the bore of the sleeve is an annular ring which is mounted within an annular groove in the external surface of the bolt.

References Cited in the file of this patent

UNITED STATES PATENTS

| | | |
|---|---|---|
| 1,045,389 | Gillmor | Nov. 26, 1912 |
| 2,123,035 | Ashley | July 5, 1938 |
| 2,600,974 | Crawford | June 17, 1952 |
| 2,798,404 | Schaefer | July 9, 1957 |